United States Patent
Huang

(10) Patent No.: US 8,259,609 B2
(45) Date of Patent: Sep. 4, 2012

(54) MODEM AND PACKET PROCESSING METHOD

(75) Inventor: Chi-Han Huang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 176 days.

(21) Appl. No.: 12/915,021

(22) Filed: Oct. 29, 2010

(65) Prior Publication Data

US 2012/0076148 A1 Mar. 29, 2012

(51) Int. Cl.
*G01R 31/08* (2006.01)
(52) U.S. Cl. ......... 370/252; 370/255; 370/394; 370/474
(58) Field of Classification Search .................. None
See application file for complete search history.

(56) References Cited

U.S. PATENT DOCUMENTS

| 6,826,235 B2* | 11/2004 | Lerner et al. ................ 375/262 |
| 6,931,009 B1* | 8/2005 | Agarwal ................ 370/395.1 |
| 2009/0300469 A1 | 12/2009 | Rajakarunanayake | |

* cited by examiner

*Primary Examiner* — Duc C Ho
(74) *Attorney, Agent, or Firm* — Altis Law Group, Inc.

(57) ABSTRACT

A modem communicates with a data source over multiple signal channels. The modem receives multiple data packets originally sent by the data source and at least one correcting packet loading reassembly information over the signal channels, and determines if one or more of the data packets originally sent by the data source are lost. The modem determines if the received data packets are enough to recover the one or more lost data packets, and recovers the one or more lost data packets using the received data packets and the reassembly information if the received data packets are enough to recover the one or more lost data packets. The modem removes the correcting packet loading the reassembly information and sends out the received data packets and the one or more recovered data packets.

18 Claims, 4 Drawing Sheets

MODEM AND PACKET PROCESSING METHOD

BACKGROUND

1. Technical Field

Embodiments of the present disclosure relate to data transmitting technology, and more particularly to a modem and packet processing method thereof.

2. Description of Related Art

Most modems can provide multiple signal channels to transmit data. Sometimes, one modem receives incomplete data which decreases communication quality because of many problems, especially for real-time voice communication. For example, increased latency of one signal channel may cause receiving packet overtime, or interference over one signal channel may cause packet lost. There remains a heretofore unaddressed need to overcome the limitations described.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated over, software code modules executed by one or more general purpose computers or processors. The code modules may be stored in any type of computer-readable medium or other storage device. Some or all of the methods may alternatively be embodied in specialized computer hardware or communication apparatus.

Figure 1:
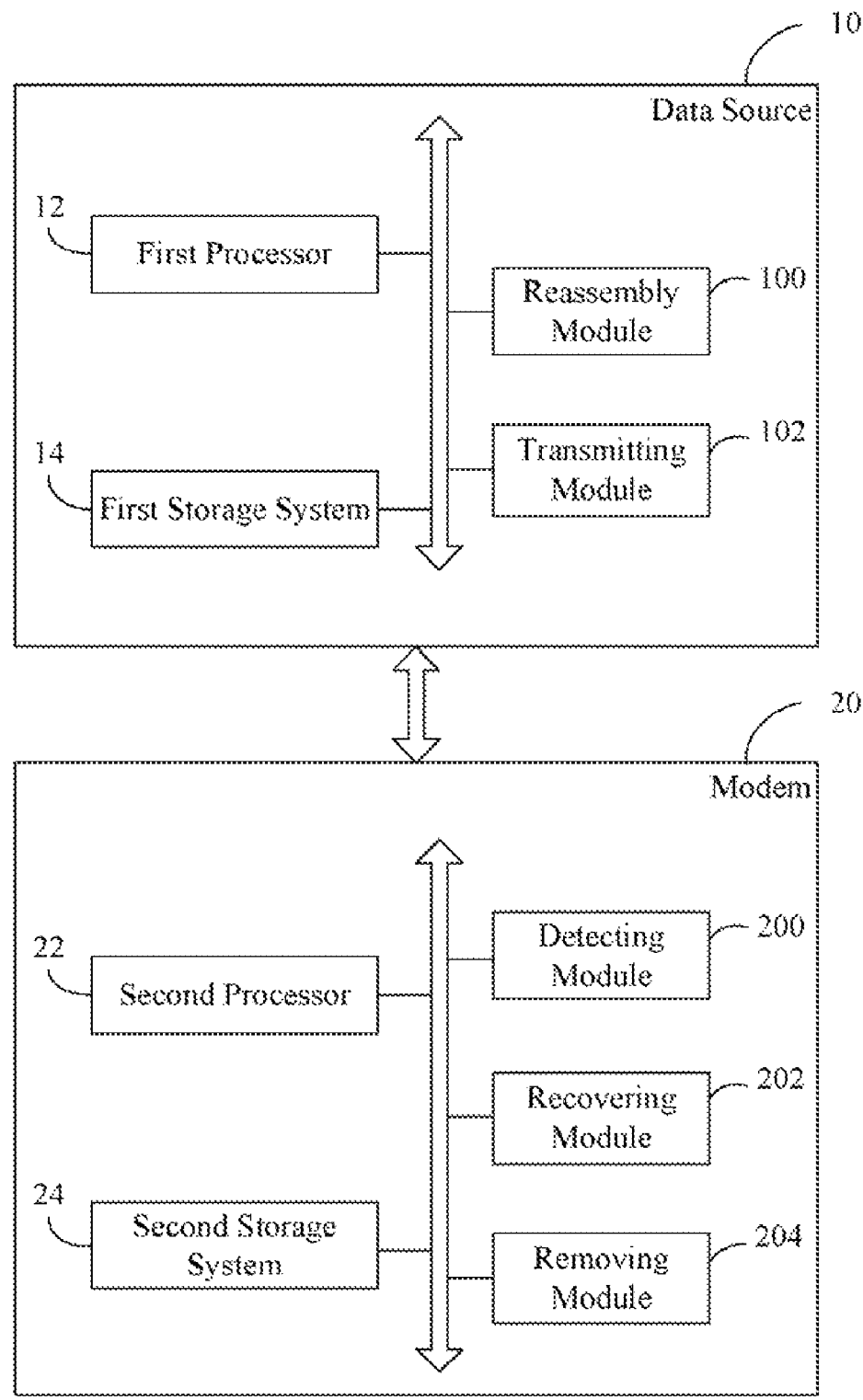
FIG. 1 is a schematic diagram of environment and functional modules of one embodiment of a modem of the present disclosure.

FIG. 1 is a schematic diagram of environment and functional modules of a modem 20 of one embodiment of the present disclosure. In one embodiment, a data source 10 and the modem 20 collectively form a data processing system to process data packets. The data source 10 processes packets and then transmits the packets to the modem 20. The modem 20 receives the packets from the data source 10, then processes the packets, and then sends out the packets. The modem 20 of the present disclosure can decrease lost packet quantity and transmits complete data to increase communication quality. Here, the data source 10 communicates with the modem 20 over multiple signal channels. In one embodiment, the data source 10 may be a terminal system or a user equipment.

In one embodiment, the data source 10 includes a first processor 12, a first storage system 14, a reassembly module 100, and a transmitting module 102. The reassembly module 100 and the transmitting module 102 may comprise computerized code in the form of one or more programs that are stored in the first storage system 14. The computerized code includes instructions that are executed by the first processor 12 to provide functions for the reassembly module 100 and the transmitting module 102.

In one embodiment, the modem 20 includes a second processor 22, a second storage system 24, a detecting module 200, a recovering module 202, and a removing module 204. The modules 200-204 may comprise computerized code in the form of one or more programs that are stored in the second storage system 24. The computerized code includes instructions that are executed by the second processor 22 to provide functions for modules 200-204.

Figure 2:
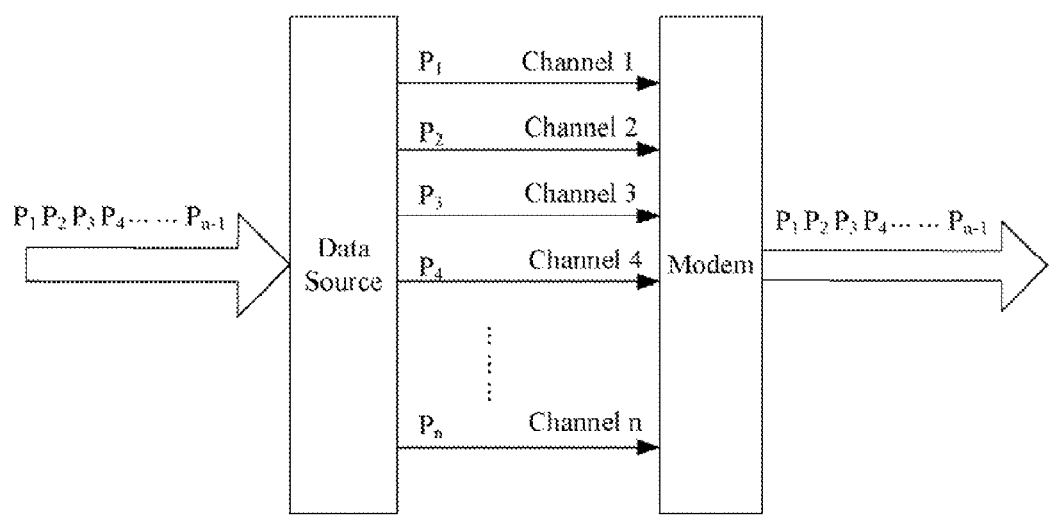
FIG. 2 is a schematic diagram of one embodiment of a data source transmitting data packets to a modem of the present disclosure.

FIG. 2 is a schematic diagram of one embodiment of the data source 10 transmitting packets to the modem 20 of the present disclosure. Hereafter are detail descriptions about above functional modules of the data source 10 and the modem 20 by referring FIG. 2.

Firstly, the reassembly module 100 receives and buffers data packets which are required to be transmitted to the modem 20 by the data source 10. The buffered data packets are transmitted by batch and each batch includes several data packets. Quantity of the data packet of one batch is less than that of the signal channels between the data source 10 and the modem 20. For example, the modem 20 provides 4 signal channels, and then each batch may include 3 packets or 2 packets. Hereafter are detail descriptions of processing one batch of the data packets, taking that packet quantity of the batch is less than the quantity of the signal channels between the data source 10 and the modem 20 by 1 for example.

The reassembly module 100 queues the data packets corresponding to the signal channels one by one. Here, $P_1 P_2 P_3 P_4 \ldots P_{n-1}$ in FIG. 2 are used to indicate the data packets corresponding to the signal channels, wherein n is the quantity of the signal channels between the data source 10 and the modem 20. A next batch of the data packets may be expressed as $P_{n+1} P_{n+2} P_{n+3} P_{n+4} \ldots P_{2n-2}$.

Then, the reassembly module 100 uses the queued data packets to generate reassembly information. The reassembly information can be generated by several methods, such as the PARITY algorithm or the REED-SOLOMN RAID algorithm. The PARITY algorithm and the REED-SOLOMN RAID algorithm both are correcting algorithms which use XOR mechanism to generate checksum. In one embodiment, the reassembly information is the checksum calculated based on the PARITY algorithm or the REED-SOLOMN RAID algorithm and according to the data packets of one batch.

Then, the transmitting module 102 transmits the batch of data packets to the modem 20 over the corresponding signal channels one by one. When the data packets are transmitted, there is at least a remaining signal channel because the packet quantity of a batch is less than the signal channel quantity of the signal channels between the data source 10 and the modem 20. The transmitting module 102 packets the reassembly information to a correcting packet loading the reassembly information (expressed as $P_n$ in FIG. 2) and transmits the correcting packet to the modem 20 over the remaining signal channel.

The detecting module 200 of the modem 20 receives the data packets originally sent by the data source 10 and the correcting packet loading the reassembly information over the signal channels and determines if one or more of the data packets originally sent by the data source 10 are lost. In one embodiment, the detecting module 200 determines if the data packets originally sent by the data source 10 are lost based on if the data packets are received in sequence.

In detail, the transmitting module 102 of the data source 10 transmits the data packets in sequence. Therefore, the detecting module 200 should receive the data packets in sequence if no data packet is lost. If the received data packets are not in sequence, there must be one or more data packets are lost. As such, the detecting module can quickly detect the one or more lost packets.

Generally, neither the PARITY algorithm nor the REED-SOLOMN RAID algorithm permits quantity of the one or more lost data packets greater than a preset value. The preset value is predetermined according to the correcting algorithm. That is, the one or more lost data packets can be recovered just when the quantity of the one or more lost data packets is less than the preset value. For example, the PARITY algorithm generates the reassembly information once and permits one lost data packet. The REED-SOLOMN RAID algorithm permits more than one lost data packet. Therefore, if one or more data packets are lost, the recovering module 202 determines if the received data packets are enough to recover the one or more lost data packets.

If the received data packets are enough to recover the one or more lost data packets, the recovering module 202 of the modem 20 recovers the one or more lost data packets according to the received data packets and the reassembly information. Then, the removing module 204 removes the correcting packet loading the reassembly information, and queues and sends out the received data packets and the one or more recovered data packets.

If the received data packets are not enough to recover the one or more lost data packets or no data packet is lost, the recovering module 202 of the modem 20 does not recover the one or more lost data packets. Then, the removing module 204 removes the correcting packet loading the reassembly information, and queues and sends out the received data packets.

Figure 3:
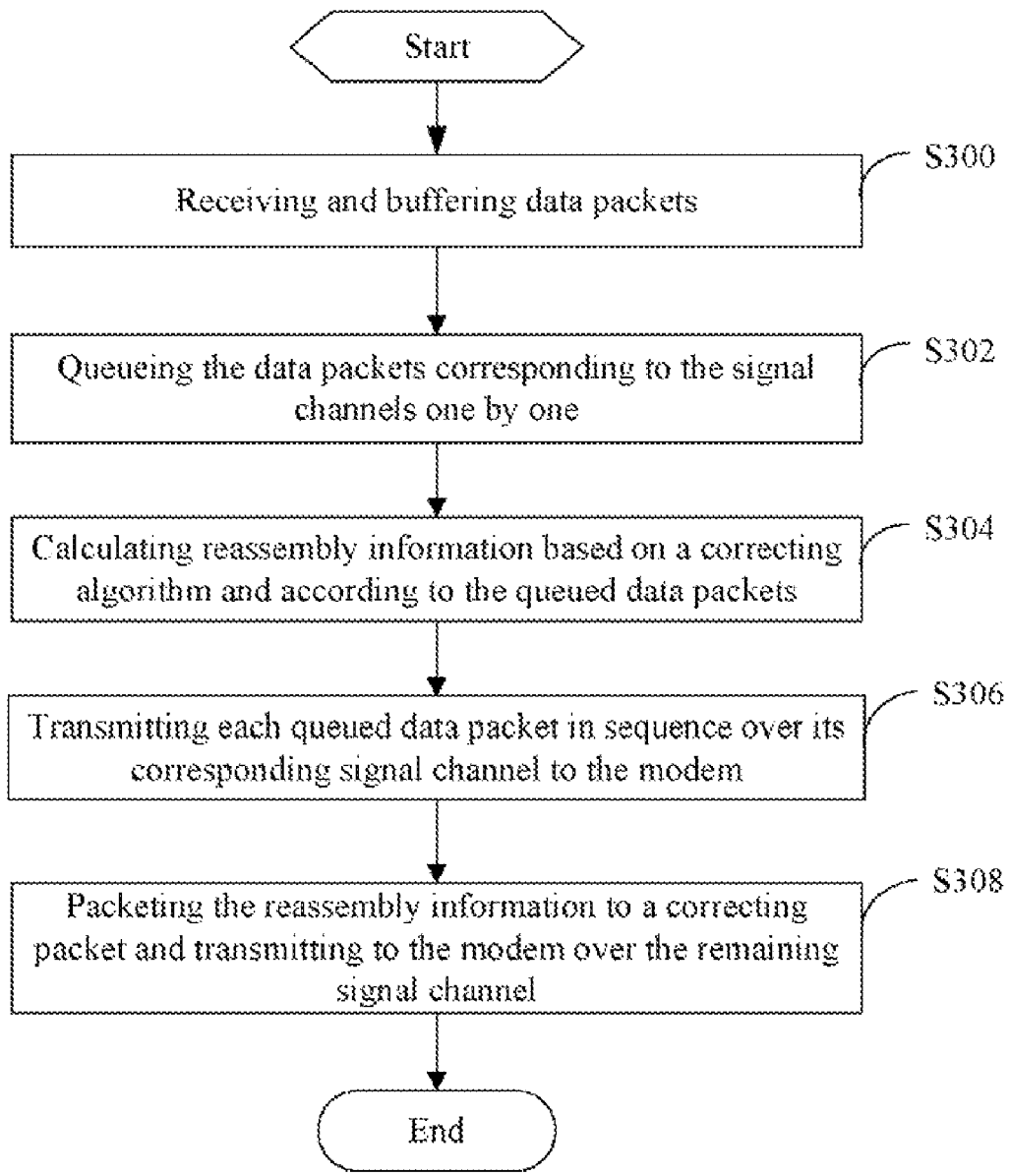
FIG. 3 is a flowchart of one embodiment of a data source processing data packets of the present disclosure.

FIG. 3 is a flowchart of the data source 10 processing data packets of the present disclosure. The flowchart is executed by the modules of the data source 10 of FIG. 1. Depending on the embodiment, additional blocks may be added, others deleted, and the ordering of blocks may be changed while remaining well within the scope of the disclosure.

In block S300, the reassembly module 100 receives and buffers data packets which are required to be transmitted to the modem 20 by the data source 10. In block S302, the reassembly module 100 queues the data packets corresponding to the signal channels one by one. The buffered data packets are transmitted by batch and each batch includes several data packets. Quantity of the data packets of one batch is less than that of the signal channels between the data source 10 and the modem 20. FIG. 3 shows processing one batch of the data packets, taking that packet quantity of the batch is less than the quantity of the signal channels between the data source 10 and the modem 20 by 1 for example.

In block S304, the reassembly module 100 uses the queued data packets to generate reassembly information. The reassembly information can be generated by several methods, such as the PARITY algorithm or the REED-SOLOMN RAID algorithm. The PARITY algorithm and the REED-SOLOMN RAID algorithm both are correcting algorithms which use XOR mechanism to generate checksum. In one embodiment, the reassembly information is the checksum calculated based on the PARITY algorithm or the REED-SOLOMN RAID algorithm and according to the data packets of one batch.

In block S306, the transmitting module 102 transmits the batch of data packets to the modem 20 over the corresponding signal channels one by one. When the data packets are transmitted, there is at least a remaining signal channel because the packet quantity of a batch is less than the channel quantity of the signal channels between the data source 10 and the modem 20. In block S308, the transmitting module 102 packets the reassembly information to a correcting packet loading the reassembly information and transmits the correcting packet loading the reassembly information to the modem 20 over the remaining signal channel.

For example, if the modem 20 provides 4 signal channels, the reassembly module 100 of the data source 10 divides the data packets to several batches and each batch includes 3 data packets. A first data packet is corresponding to a first signal channel, a second data packet is corresponding to a second signal channel, and a third data packet is corresponding to a third signal channel. The reassembly module 100 of the data source 10 generates first reassembly information according to the first data packet, the second data packet, and the third data packet. Next, the transmitting module 102 transmits the first, second, third data packet respectively over the first, second, third signal channel. Then, the transmitting module 102 packets the first reassembly information to a first correcting packet loading the first reassembly information and transmits the first correcting packet over a fourth signal channel.

After that, the reassembly module 100 corresponds a fourth data packet to the first signal channel, a fifth data packet to the second signal channel, and a sixth data packet to the third signal channel. The reassembly module 100 of the data source 10 generates second reassembly information according to the fourth data packet, the fifth data packet, and the sixth data packet. Next, the transmitting module 102 transmits the fourth, fifth, sixth data packet respectively over the first, second, third signal channel. Then, the transmitting module 102 packets the second reassembly information to a second correcting packet loading the second reassembly information and transmits the correcting packet over a fourth signal channel. The data source 10 processes the remaining data packets according to the flowchart of FIG. 3 until all of the data packets are processed.

Figure 4:
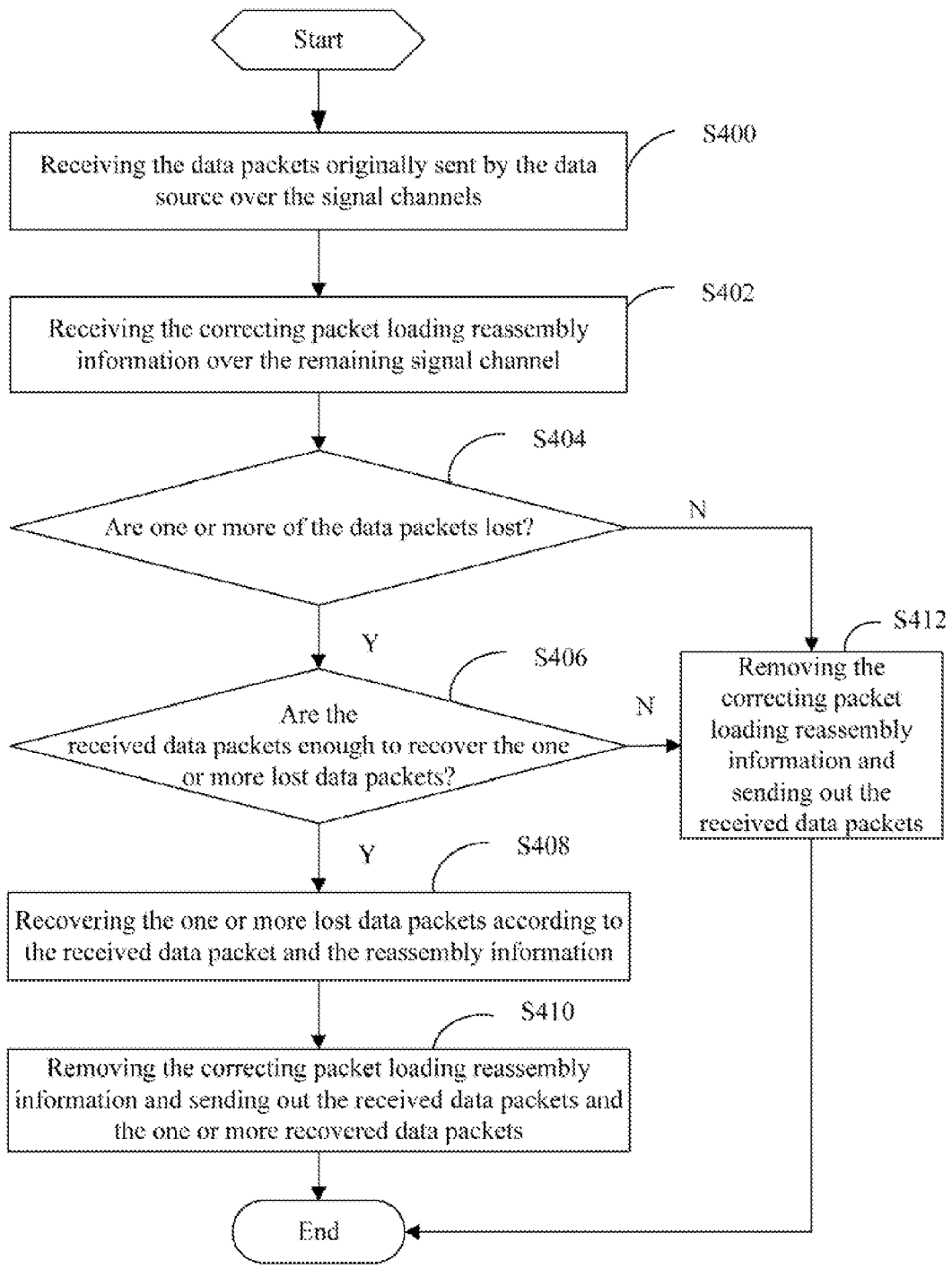
FIG. 4 is a flowchart of one embodiment of a packet processing method of the present disclosure.

FIG. 4 is a flowchart of a packet processing method of the present disclosure. The flowchart is executed by the modules of the modem 20 of FIG. 1. Depending on the embodiment, additional blocks may be added, others deleted, and the ordering of blocks may be changed while remaining well within the scope of the disclosure.

In block S400, the detecting module 200 of the modem 20 receives the data packets originally sent by the data source 10 over the signal channels, and in block S402, receives the correcting packet loading the reassembly information from the data source 10 over the remaining signal channel. In block S404, the detecting module 200 determines if one or more of the data packets originally sent by the data source 10 are lost. In one embodiment, the detecting module 200 determines if the one or more lost packets based on if the received data packets are in sequence. If the received data packets are in sequence, the detecting module 200 determines that not one of the data packets is lost. If the received data packets are not in sequence, the detecting module 200 determines that one or more of the data packets are lost.

For example, if the data source 10 transmits a first data packet, a second data packet, a third data packet, a fourth data packet, then the detecting module determines that 1 data packet are lost when the modem 20 receives the third data packet after the first data packet. As the same, the detecting module determines that 2 data packets are lost when the modem 20 receives the fourth data packet after the first data packet.

If one or more data packets are lost, then in block S406, the recovering module 202 determines if the received data packets are enough to recover the one or more lost data packets. If the received data packets are enough to recover the one or more lost data packets, then in block S408, the recovering module 202 of the modem 20 recovers the one or more lost data packets according to the received data packets and the reassembly information. Then in block S410, the removing module 204 removes the correcting packet loading the reassembly information, and queues and sends out the received data packets and the one or more recovered data packets.

If not one of the data packets are lost or if the received data packets are not enough to recover the one or more lost data packets, then in block S412, the removing module 204 removes the correcting packet loading the reassembly information, and queues and sends out the received data packets.

For example, if the detecting module 100 of the modem receives the first data packet, the third data packet, the first reassembly information, the fourth data packet, the fifth data packet, the sixth data packet, and the second reassembly information, then the detecting module 200 quickly determines that the second data packet is lost over the second signal channel when the third data packet is received after the second data packet.

After that, the recovering module 202 recovers the second data packet according to the first data packet, the third data packet, and the first reassembly information. Then, the removing module 204 removes the first reassembly information and sends out the first data packet, the second data packet, and the third data packet, and then removes the second reassembly information and sends out the fourth data packet, the fifth data packet, and the sixth data packet. The modem 20 processes the remaining data packets according to the flowchart of FIG. 4 until all of the received data packets are processed.

The modem 20 and the packet processing method of the present disclosure receives the data packets and the reassembly information over the multiple signal channels in sequence and recovers the one or more lost data packets according to the received data packets and the reassembly information. Therefore, the modem 20 and the packet processing method of the present disclosure can quickly determine if one or more of the data packets are lost and recover the one or more lost data packets conveniently, which decreases quantity of the lost data packets, complete the communication data, and improves the quality of the communication.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A modem in communication with a data source over multiple signal channels, the modem comprising a processor, a storage system, and one or more programs stored in the storage system and operable to be executed by the processor, comprising:

a detecting module to receive multiple data packets originally sent by the data source and at least one correcting packet loading reassembly information over the signal channels, and to determine if one or more of the data packets originally sent by the data source are lost according to the received data packets, wherein the reassembly information is a checksum calculated based on a correcting algorithm and according to the data packets originally sent by the data source;

a recovering module to determine if the received data packets are enough to recover the one or more lost data packets upon the condition that the one or more of the data packets are lost and the correcting packet loading reassembly information is received, and to recover the one or more lost data packets using the received data packets and the reassembly information upon the condition that the received data packets are enough to recover the one or more lost data packets; and a removing module to remove the correcting packet loading reassembly information, and to queue and send out the received data packets and the one or more recovered data packets.

2. The modem as claimed in claim 1, wherein the detecting module determines if the one or more data packets are lost based on if the data packets are received in sequence.

3. The modem as claimed in claim 2, wherein the detecting module determines that the one or more of the data packets are lost upon the condition that the data packets are not received in sequence.

4. The modem as claimed in claim 2, wherein the detecting module determines not one of the data packets is lost upon the condition that the data packets are received in sequence.

5. The modem as claimed in claim 1, wherein the recovering module determines whether the data packets are enough based on if quantity of the one or more lost data packets is greater than a preset value, wherein the preset value is predetermined according to the correcting algorithm.

6. The modem as claimed in claim 5, wherein the recovering module determines that the received data packets are enough to recover the one or more lost data packets upon the condition that the quantity of the one or more lost data packets are less than the preset value.

7. The modem as claimed in claim 5, wherein the recovering module determines that the received data packets are not enough to recover the one or more lost data packets upon the condition that the quantity of the one or more lost data packets are greater than the preset value.

8. The modem as claimed in claim 1, wherein the correcting algorithm is the PARITY algorithm.

9. The modem as claimed in claim 1, wherein the correcting algorithm is the REED-SOLOMN RAID algorithm.

10. A packet processing method of a modem communicating with a data source over multiple signal channels, comprising:

receiving multiple data packets originally sent by the data source and at least one correcting packet loading reassembly information over the signal channels, wherein the reassembly information is a checksum calculated based on a correcting algorithm and according to the data packets originally sent by the data source;

determining if one or more of the data packets originally sent by the data source are lost according to the received multiple data packets;

determining if the received data packets are enough to recover the one or more lost data packets if the one or more of the data packets are lost and the correcting packet loading reassembly information is received;

recovering the one or more lost data packets using the received data packets and the reassembly information if the received data packets are enough to recover the one or more lost data packets;

removing the correcting packet loading the reassembly information; and queuing and sending out the received data packets and the one or more recovered data packets.

11. The packet processing method as claimed in claim 10, wherein determining the lost data packet is based on if the data packets are received in sequence.

12. The packet processing method as claimed in claim 11, wherein determining the lost data packet comprises: determining that the one or more of the data packets are lost if the data packets are not received in sequence.

13. The packet processing method as claimed in claim 11, wherein determining the lost data packet comprises: determining that not one of the data packets is lost if the data packets are received in sequence.

14. The packet processing method as claimed in claim 10, wherein determining whether the data packets are enough is based on if quantity of the one or more lost data packets is greater than a preset value, wherein the preset value is predetermined according to the correcting algorithm.

15. The packet processing method as claimed in claim 14, wherein determining whether the data packets are enough comprises: determining that the received data packets are enough to recover the one or more lost data packets based on that the quantity of the one or more lost data packets are less than the preset value.

16. The packet processing method as claimed in claim 14, wherein determining whether the data packets are enough comprises: determining that the received data packets are not enough to recover the one or more lost data packets based on that the quantity of the one or more lost data packets are greater than the preset value.

17. The packet processing method as claimed in claim 10, wherein the correcting algorithm is the PARITY algorithm.

18. The packet processing method as claimed in claim 10, wherein the correcting algorithm is the REED-SOLOMN RAID algorithm.

* * * * *